US006977005B2

(12) United States Patent
Erdmann et al.

(10) Patent No.: US 6,977,005 B2
(45) Date of Patent: Dec. 20, 2005

(54) WATERLESS VACUUM TOILET SYSTEM FOR AIRCRAFT

(75) Inventors: Wolfgang Erdmann, Buxtehude (DE); Torsten Gienke, Pinneberg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 164 days.

(21) Appl. No.: 10/620,480

(22) Filed: Jul. 15, 2003

(65) Prior Publication Data

US 2004/0010843 A1    Jan. 22, 2004

Related U.S. Application Data

(63) Continuation-in-part of application No. 10/017,491, filed on Oct. 22, 2001, now abandoned, which is a continuation-in-part of application No. 09/603,854, filed on Jun. 26, 2000, now abandoned.

(30) Foreign Application Priority Data

Jun. 24, 1999 (DE) ................................ 199 28 894

(51) Int. Cl.[7] ............................ B01D 35/16; E03D 5/00
(52) U.S. Cl. ...................... 55/431; 4/316; 4/321; 4/434; 4/472
(58) Field of Search ................... 4/316, 321, 431–434, 4/449, 472, 475, 477, DIG. 10; 55/431

(56) References Cited

U.S. PATENT DOCUMENTS

| | | | |
|---|---|---|---|
| 1,050,435 A | * | 1/1913 | Eastman .......................... 4/477 |
| 2,700,775 A | * | 2/1955 | Martin ......................... 4/111.5 |
| 3,405,454 A | | 10/1968 | Zeff ............................. 34/371 |
| 3,457,567 A | | 7/1969 | Criss ............................. 4/472 |
| 4,346,002 A | | 8/1982 | Petzinger ..................... 210/202 |
| 4,678,685 A | | 7/1987 | Hasson et al. .............. 427/235 |
| 4,928,326 A | | 5/1990 | Olin et al. ...................... 4/300 |
| 5,245,711 A | | 9/1993 | Oldfelt et al. ................. 4/435 |

(Continued)

FOREIGN PATENT DOCUMENTS

DE          9201684          6/1992

(Continued)

OTHER PUBLICATIONS

A brochure entitled: "Das Zentrale Vakuumtoiletten-System Fuer Die Schiffsausruestung", from the company *sanivac Vakuumtechnik GmbH*, 1997, 4 pages.

(Continued)

Primary Examiner—Richard L. Chiesa
(74) Attorney, Agent, or Firm—W. F. Fasse; W. G. Fasse

(57) ABSTRACT

A waterless vacuum toilet system for an aircraft includes a toilet bowl connected via a suction valve and a waste collection pipe to a waste collection tank. Waste-contacting surfaces that come into contact with urine and fecal waste are coated with an adhesion-inhibiting or adhesion-reducing nanocoating. The adhesion of waste is significantly reduced, and the need for flushing water is completely eliminated. Instead, an air jet arrangement preferably including an annular ring nozzle or annular air gap directs an airflow into the toilet bowl and along the nanocoated waste-contacting surface thereof, to "air flush" the waste material from these surfaces. The flushing airflow may be induced through the air jet arrangement into the toilet bowl by the suction applied through the suction valve. The "air flushed" toilet system substantially reduces the total system weight and eliminates the need for toilet flushing water to be carried in the aircraft.

17 Claims, 3 Drawing Sheets

U.S. PATENT DOCUMENTS

| | | | | |
|---|---|---|---|---|
| 5,317,763 | A | 6/1994 | Frank et al. | 4/434 |
| 5,454,936 | A | 10/1995 | Ask et al. | 210/86 |
| 5,909,968 | A * | 6/1999 | Olin et al. | 4/431 |
| 5,997,961 | A | 12/1999 | Feng et al. | 427/515 |
| 6,148,666 | A | 11/2000 | Roesicke | 73/290 R |
| 6,207,236 | B1 | 3/2001 | Araki et al. | 427/386 |
| 2002/0112281 | A1 | 8/2002 | Erdmann et al. | |

FOREIGN PATENT DOCUMENTS

| | | |
|---|---|---|
| DE | 4201986 | 4/1993 |
| DE | 19928894 | 1/2001 |
| EP | 0295508 | 12/1988 |
| EP | 0363012 | 4/1990 |
| EP | 1063167 | 12/2000 |

OTHER PUBLICATIONS

"Waterless No-Flush Urinals", internet web page of Waterless Co., www.waterless.com; copyright 1997, printed Sep. 2003.

* cited by examiner

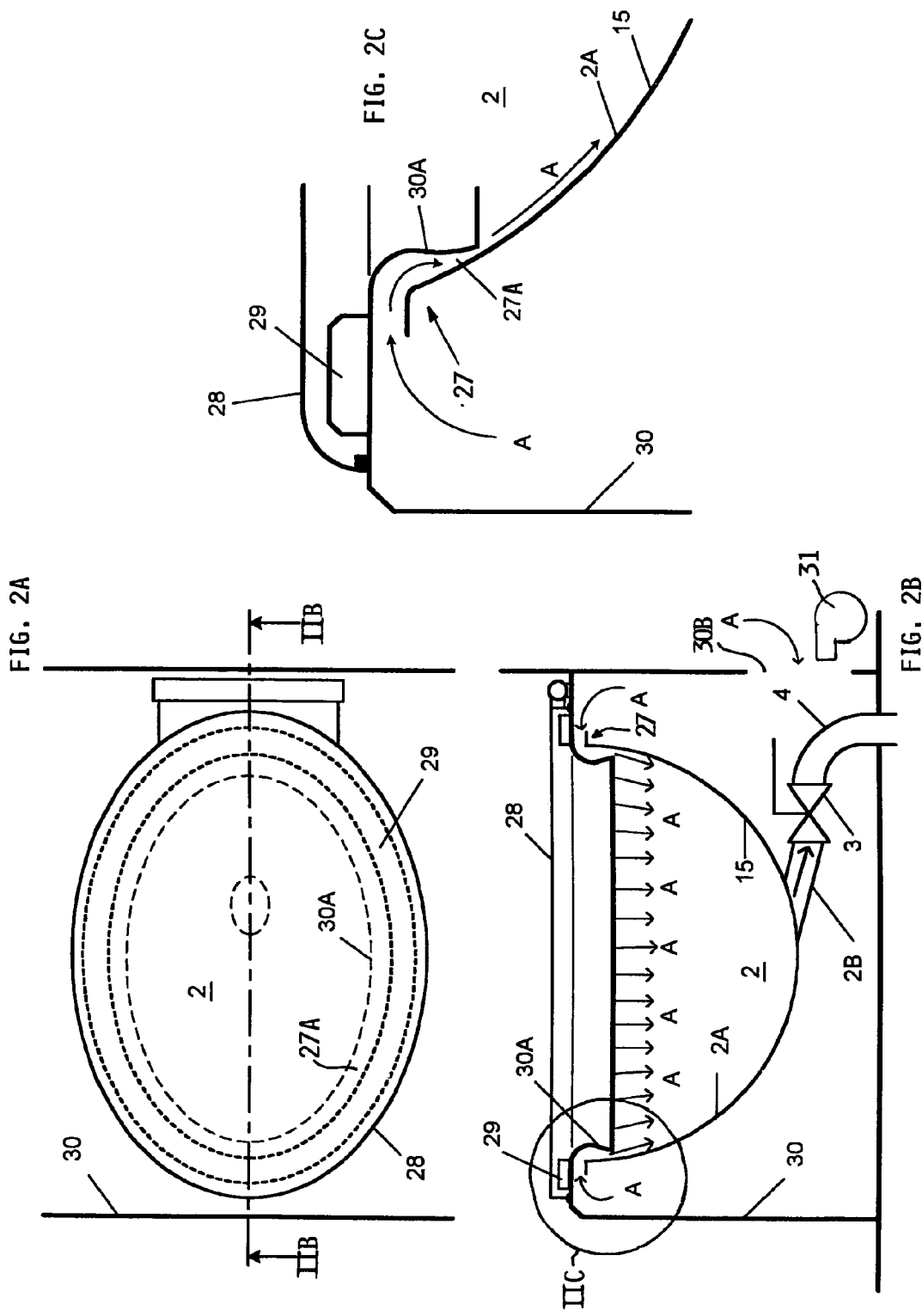

WATERLESS VACUUM TOILET SYSTEM FOR AIRCRAFT

CROSS-REFERENCE TO RELATED APPLICATION

This application is a Continuation-in-Part of U.S. application Ser. No. 10/017,491, filed Oct. 22, 2001, now abandoned, which is a Continuation-in-Part of U.S. application Ser. No. 09/603,854, filed Jun. 26, 2000, now abandoned.

PRIORITY CLAIM

This application claims the priority under 35 U.S.C. §119 of German Patent Application 199 28 894.1, filed on Jun. 24, 1999.

FIELD OF THE INVENTION

The invention relates to a vacuum toilet system, especially for a passenger transport aircraft, including at least one toilet bowl connected to a waste collection tank by a suction valve.

BACKGROUND INFORMATION

Transportation vehicles, particularly aircraft, have only a limited capacity for carrying flushing liquid for rinsing or flushing toilets and for storing the waste water that results. For this reason, transportation vehicles often use toilet systems in which the toilet bowl is connected to a waste collection tank by a suction valve, and particularly toilet systems that are constructed as vacuum systems which aim to reduce the amount of flushing liquid that is required. Conventional vacuum toilet systems in aircraft use a flushing liquid to flush the toilet bowl, whereby the flushing liquid can be fresh water or can be in part so-called gray water, i.e., fresh water that has already been used for hand washing or the like without being contaminated with fecal waste or urine, and may be supplemented by deodorizers, disinfectants, etc. The flushing liquid is sometimes referred to as "flush water" herein for simplicity.

German Patent 42 01 986 and corresponding U.S. Pat. No. 5,317,763 (Frank et al.), issued June 1994, disclose a vacuum toilet that is essentially equipped with a trigger device, a flush water valve, and a suction valve that is arranged in a connecting conduit between the toilet bowl and the waste collection tank. After the trigger is actuated, the flushing liquid is delivered to the toilet bowl by means of control devices. Subsequently, the suction valve opens and the waste contained in the toilet bowl is flushed together with the flushing liquid into the waste collection tank.

A brochure titled "Das Zentrale Vakuum Toiletten-System für die Schiffsausrüstung" ("The Central Vacuum Toilet System for the Outfitting of Ships") from the company sanivac Vakuumtechnik GmbH of Wedel, Germany (1997) discloses a vacuum toilet system that is used for marine vessels. This system, too, requires less flushing water than the conventional gravity flush toilet systems because of the use of vacuum technology that reduces the demand for flushing liquid to approximately 1 liter per flush. This reference also discloses that the waste pipe of the system may be a steel pipe with an inner surface coating of plastic.

German Utility Model Publication DE 92 01 684 U1 discloses a toilet arrangement in which an odor-binding agent or cleaning agent is added to the flushing liquid in the flushing circuit. This increases the effectiveness of the toilet flushing and reduces the formation of odor. This reference further suggests coating the inner surface of the toilet bowl with a layer of polytetrafluoroethylene (PTFE), to facilitate the cleansing or flushing of fecal residue from the toilet bowl.

European Patent Publications EP 0,295,508 and EP 0,363,012 disclose vacuum toilet systems that use "gray water", at least in part, for rinsing or flushing the toilet bowl. In these cases, it is necessary that the water previously used in the wash basins be processed with a suitable filter technology in order to prevent blockage of the flush water line. Thus, in addition to the necessary controls for the flushing process, it is also necessary with such systems to provide a water treatment process.

Various attempts have been made, in applications other than aircraft, to provide waterless or flushless toilet systems, i.e. toilet systems that do not require a flushing liquid for flushing the urine and fecal waste from the toilet bowl, for example as represented by U.S. Pat. No. 3,457,567 (Criss) and U.S. Pat. No. 4,346,002 (Petzinger). These are generally composting toilet systems that use a cone or wrapper of paper or plastic for receiving, containing and encapsulating the fecal waste in the toilet bowl and then transporting the resulting encapsulated package by vacuum suction through a waste line to a holding/composting tank. The encapsulating wrapper aims to prevent direct contact of the fecal waste with the inner surfaces of the toilet bowl, which of course avoids the need of cleaning or removing the fecal waste from the inner surfaces of the toilet bowl. In other words, such systems do not have any waste-contacting surfaces in the toilet bowl or waste lines, because the waste is fully encapsulated in a wrapper.

Such systems are not well suited to applications in commercial passenger transport vehicles such as aircraft, because they are not sufficiently robust and reliable. For example, experience has shown that passengers often try to dispose of various items in addition to feces and urine in the toilets, including feminine hygiene products, bottle caps, razor blades, wrappers and packaging of various products, etc. Such items will inevitably puncture the waste-encapsulating wrapper, causing feces to directly contact, soil and adhere to the inner surfaces of the toilet bowl and waste line. Also in such systems, the wrapper-providing arrangement is highly subject to malfunction and failure, and/or requires proper operating efforts and procedures by the toilet user.

Reducing the amount of water or liquid required for flushing the toilets is of great importance, particularly on board an aircraft, because this would reduce the total gross weight of the aircraft and correspondingly increase the usable carrying capacity for passengers, cargo and fuel, reduce the fuel consumption, and/or increase the flight range. It would be highly advantageous and desirable to completely eliminate the need of flushing an aircraft vacuum toilet system with a flushing liquid. On large capacity aircraft, for example that can carry up to 500 passengers, sufficient water for flushing the toilets (fresh water or "gray water") must be provided for each passenger to use the toilet one or more times, with further consideration of the duration of the flight. Although a number of toilet systems that require a reduced volume of flushing liquid are already known, it is still important and necessary, particularly for large capacity aircraft, to further reduce or entirely eliminate the water demand for flushing and rinsing purposes. This is particularly true for large capacity aircraft that fly long distances (i.e. long flight durations) and, accordingly, must otherwise carry an enormous amount of water. The toilet system for an aircraft must also have a high reliability, ease of use, and low maintenance requirements.

SUMMARY OF THE INVENTION

For the above reasons it is an object of the invention to provide a toilet system that provides a further weight reduction compared to the conventional systems. It is a further object to completely eliminate the necessity for flush water in a vacuum toilet system for an aircraft, and thereby to simplify the system and provide a toilet system that is particularly suitable for use in large capacity aircraft. As another object, the invention aims to provide an "air flush" arrangement for a waterless vacuum toilet system for an aircraft. Yet another object is to provide a method of manufacturing such an improved toilet bowl for a toilet system. The invention further aims to avoid or overcome the disadvantages of the prior art, and to achieve additional advantages, as apparent from the present specification.

The above objects have been achieved in a toilet system according to the invention in which the toilet bowl is connected by a suction valve to a waste collection tank, and in which at least some of the system components that come into contact with waste material are provided with a nanocoating. Particularly at least a portion of the inner bowl surface of the toilet bowl itself is provided with a thin film coating deposited by nanotechnology processes. Preferably, the nanocoating is provided at least on the entirety of the waste-contacting inner surface area of the toilet bowl, whereby the nanocoating may have a large surface area, such as at least 250 $cm^2$ or even at least 500 $cm^2$. Such a nanocoating significantly reduces or eliminates the adhesion of fecal residue and other wastes on the waste-contacting surfaces of the toilet bowl, the waste line, the flush valve, and/or the waste tank, and therefore eliminates the need for flushing the toilet bowl with a flushing liquid. The nanocoating also avoids the need to provide wrappers or the like for encapsulating the fecal waste in the toilet bowl, as in some prior art systems. These features in turn simplify and reduce the weight of the overall toilet system.

According to a further feature of the toilet system according to the invention, the flush water and consequently the flush water circuit are completely eliminated by instead providing an "air flushing" arrangement. This simplifies the system by reducing the number of its components, and reduces the maintenance and repair effort. By applying suction through the toilet bowl outlet during the toilet bowl emptying process, an airflow is sucked into the bowl and downwardly to the bowl outlet, which assists in sweeping and removing the fecal und urine waste from the (preferably nano-coated) waste-contacting surfaces of the bowl downwardly to the bowl outlet. The airflow can be enhanced or especially directed along the waste-contacting surfaces by airflow directing means such as an air jet arrangement (passive or active), for example including an annular air gap forming an annular nozzle that communicates the airflow from an air plenum space in a toilet-surrounding shroud into the interior of the toilet bowl and particularly directs the airflow toward and along the inner waste-contacting surfaces of the toilet bowl. By means of this airflow, it is possible to achieve good cleansing of the (preferably nano-coated) waste-contacting surfaces of the toilet bowl, without flush water. A very small amount of a deodorizer and/or disinfectant may be separately applied to the interior of the toilet bowl.

The invention further provides a method for manufacturing a toilet system according to the invention. The surface of the toilet bowl to be coated with the nanocoating can be pretreated with grinding, polishing and surface cleaning operations. The nanocoating can be applied by means of cathodic sputtering or gas phase deposition processes such as chemical vapor deposition or physical vapor deposition processes. Waste contamination and adhesion of particles can be avoided particularly by applying the nanocoating to the waste-contacting surface portion of the toilet bowl that comes into contact with waste materials or is exposed to a passenger.

According to the invention there are several alternatives for forming the adhesion-inhibiting, or at least adhesion-reducing, coatings. The nanocoating is preferably made of a metal, or an element of the fourth major group of the periodic system, or of a composition with a covalent bonding character or an ionic bonding character. Alternatively, the nanocoating can consist of a sialon composition, that is, an alloy of silicon nitride and aluminum oxide, or a polymer. The nanocoating is preferably applied to surfaces of the system components that are within the toilet bowl area and/or come into contact with waste material. A base layer may be applied to the area of the toilet bowl to which the nanocoating will subsequently be applied to improve the retention of the adhesion-inhibiting or at least adhesion-reducing coating.

The toilet system according to the invention is particularly advantageous because it provides a substantial reduction in weight relative to the conventional systems. This is especially important for the use of such toilet systems in aircraft. The weight that is saved due to the elimination of flush water can be used, for example, to allow increasing the seating capacity in the aircraft.

BRIEF DESCRIPTION OF THE DRAWINGS

In order that the invention may be clearly understood, it will now be described in connection with example embodiments, with reference to the accompanying drawings, wherein:

FIG. 2A is a schematic top plan view of the toilet bowl of FIG. 1, on an enlarged scale relative to FIG. 1 to show further details thereof;

FIG. 2B is a sectional side view of the toilet bowl of FIG. 2A, along the section line IIB—IIB;

FIG. 2C is an enlarged detail sectional side view of the detail area IIC of the toilet bowl of FIG. 2B;

DETAILED DESCRIPTION OF PREFERRED EXAMPLE EMBODIMENTS AND OF THE BEST MODE OF THE INVENTION

Figure 1:
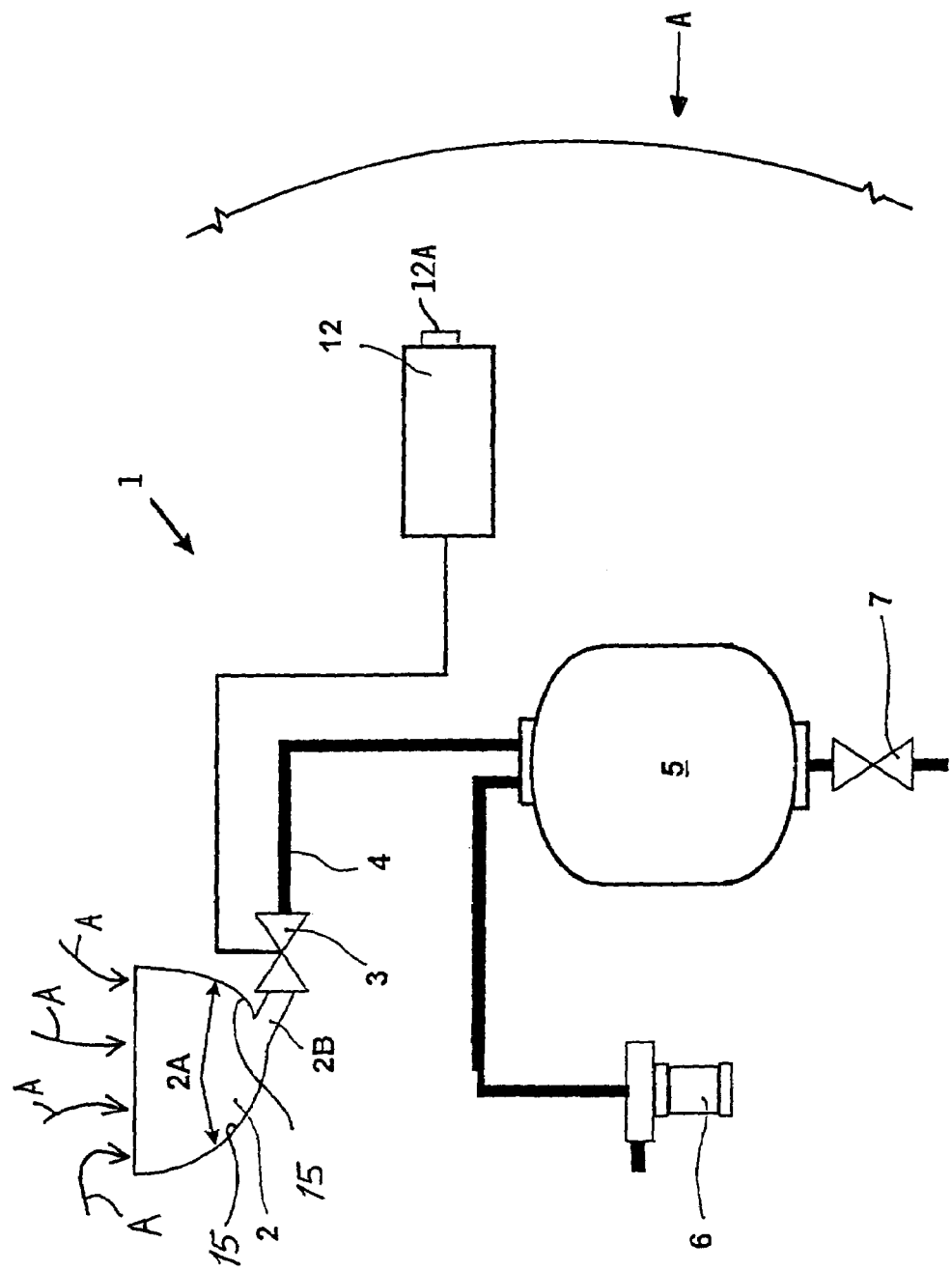
FIG. 1 is a schematic diagram of a vacuum toilet system with a toilet bowl according to the invention entirely omitting the use of a flushing liquid in an aircraft.

FIG. 1 is a schematic representation of a toilet system 1 according to the invention in an aircraft AC schematically represented by a broken section of a wall of the aircraft fuselage thereof. The toilet system 1 comprises essentially at least one toilet bowl 2 that is connected via a waste valve 3 to a waste collection pipe 4. The term toilet bowl herein includes all possible types and configurations of toilets for the disposal of urine and/or fecal waste including sit-down toilets, crouching-type toilets, urinals, etc., while the drawings schematically show a sit-down toilet configuration as an example. It is possible to connect a plurality of toilets 2 located at various locations in the aircraft AC to the waste collection pipe 4. The waste collection pipe 4 includes pipes, conduits, hoses, or lines that are used to convey waste material. The waste collection pipe 4 leads to a waste collection tank 5 in which the waste material is collected.

A pressure differential between the toilet bowl 2 (which contains waste) and the waste collection tank 5 effectuates the waste transport operation. Thus, the toilet system 1 is constructed as a vacuum toilet system. A vacuum generator 6 may generate the necessary negative pressure applied to the tank 5. The vacuum toilet system 1 can additionally or alternatively make use of the prevailing reduced external atmospheric pressure during flight to provide the pressure differential between the toilet bowl 2 and the waste collection tank 5 required for proper functioning of the vacuum toilet system 1. The waste collection tank 5 is further connected to a tank drain valve 7 by means of which the collected waste material can be discharged as needed, e.g. during usual ground maintenance of the aircraft.

As will be described in detail below, the inventive toilet system 1 is an "air flushed" vacuum toilet system that does not require any flushing liquid for flushing the waste material from the toilet bowl 2. Thus, the inventive toilet system 1 entirely omits a flush water storage tank, a flush water supply line, a flush water control valve, and a flush water dispenser such as flush water nozzles directing flush water into the toilet bowl, as are conventionally required for prior art vacuum toilet systems in aircraft. This is a substantial simplification of the overall toilet system 1, which not only reduces the weight of the toilet system 1, but also reduces the cost and effort of maintenance and repair. For example, due to the elimination of the flush water valve, maintenance measures for cleaning, decalcifying and replacing the seal elements of this valve are also eliminated and the overall reliability of the system increases since leakages in the flush water circuit are also eliminated.

Generally, an "air flushing" or "dry flushing" operation of the toilet bowl 2 is carried out as follows. After a passenger has used the toilet, the waste material, i.e. feces, urine and/or other waste such as toilet paper, collects by the force of gravity near or in a toilet drain 2B of the toilet bowl 2 leading to the waste valve 3. A control unit 12 controls the actions of the waste valve 3, responsive to the actuation of a flush control button 12A. Namely, after the toilet has been used, the passenger initiates the waste removal or "air flushing" operation by actuating the flush control button 12A or other trigger device, whereupon the control unit 12 opens the waste valve 3 for a brief time so as to convey the waste material out of the toilet bowl 2 through the bowl outlet or drain 2B, through the valve 3 and into the waste collection pipe 4, and from there into the waste collection tank 5, by means of the abovementioned pressure differential between the toilet and the tank.

As already explained, the inventive "air flushed" toilet system 1 does not use any flushing liquid for rinsing and flushing the toilet bowl 2. Instead, an airflow A that flows into the toilet bowl, being induced by the just-mentioned pressure differential and suction out of the bowl through the drain 2B, additionally "flushes" or "sweeps" the waste material out of the bowl 2 through the drain 2B. A particular preferred embodiment of an air flushing arrangement in this regard will be described below in connection with FIGS. 2A, 2B and 2C.

Figure 5:
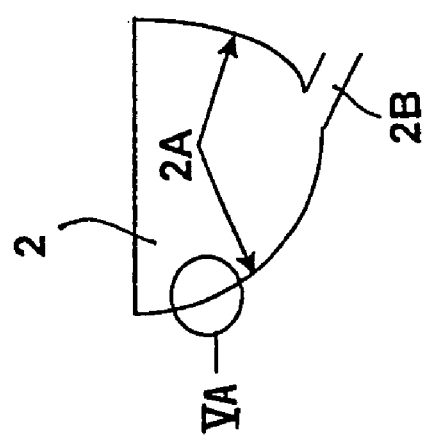
FIG. 5 schematically shows a toilet bowl according to the invention.

Flush water is necessary in conventional toilet systems in order to clean the toilet bowl 2 of any waste material that remains adhered to the inner surfaces of the toilet bowl 2. In order to be able to eliminate or remove such waste or contamination without flush water according to the invention, a relevant surface area of the toilet bowl 2 is preferably coated with a special nanocoating 15. The nanocoating 15 is applied to the inside surface of the toilet bowl 2 at least in a waste-contacting surface area 2A that comes into contact with the waste material, as indicated in FIGS. 1, 2B, and 5. The structure and the mode of manufacturing the nanocoating 15 is shown in more detail in the FIGS. 3 to 5A and described in more detail below. The nanocoating 15 has adhesion-inhibiting or at least adhesion-reducing properties.

The example embodiment of the toilet system 1 schematically shown in FIG. 1 uses a nano-coated toilet bowl 2 that avoids the need of flush water for cleaning or flushing the toilet bowl. This is achieved because the nanocoating 15 minimizes or prevents the adhesion of urine and fecal waste material onto the inner surfaces 2A of the toilet bowl 2, so that the above mentioned airflow A together with the effect of gravity are sufficient to remove the waste material from the bowl 2 out through the drain 2B during an air flushing operation. Thus, particularly for large capacity aircraft that fly long distances, the amount of water that must be carried on board the aircraft is substantially reduced, and the flush water storage tank and supply equipment are entirely eliminated. Also, the waste collection tank 5 can be made smaller, as it now only needs to collect the arising waste material without additional used flush water. As a result, additional weight capacity is now available for additional passenger seats or for other measures that will increase the comfort of the passengers.

FIGS. 2A, 2B and 2C show a particular toilet bowl 2 according to a detailed example embodiment of the invention, which is preferably to be used in the overall toilet system 1 discussed above. The toilet bowl 2 is provided with a nanocoating 15 at least in the waste-contacting area 2A as shown in FIGS. 1, 2B and 5, and as generally discussed above. This is the area 2A where waste material comes into contact with the inner surface of the toilet bowl 2.

As discussed above, only the opening and closing of the waste valve 3 is necessary for "flushing" the toilet to remove the collected waste material from the toilet bowl 2. In other words, it is no longer necessary to actuate a flush water valve in proper coordination with the waste valve 3. Instead, the waste material easily "slides" down from the nanocoated waste-contacting surfaces 2A, so that the waste material is completely removed from the toilet bowl 2 by the combined effects of gravity and the induced airflow A, without needing any flushing liquid. Namely, the waste material is conveyed out of the toilet bowl 2 primarily by means of the suction created by the vacuum that exists within the toilet system, which in turn induces the airflow A into the toilet bowl as described above, when the suction waste valve 3 is opened. The airflow A is thereby caused to flow into the bowl 2, and particularly directed downwardly along the nanocoated waste-contacting surfaces 2A toward the outlet 2B. Moreover, the downward force of gravity acts advantageously on the waste that falls onto the surfaces 2A because of the minimal adhesion properties of the nanocoating 15 provided thereon. After the waste material has been removed, the toilet bowl 2 is left in a clean condition without having to be flushed with liquid.

Preferably as shown in FIGS. 2A, 2B and 2C, the toilet bowl 2 may be additionally equipped with airflow directing means to passively or actively direct an airflow forcefully along the waste-contacting surfaces 2A of the toilet bowl 2. In this embodiment, an air jet arrangement 27 is provided instead of a water spraying flush ring as in a conventional toilet. The air jet arrangement 27 directs and blows the airflow A as an annular sheet or film of air downward along the inner surfaces 2A of the bowl 2 to assist in moving any remaining waste material down into the toilet drain 2B.

In the present embodiment, the air jet arrangement 27 comprises an annular airflow nozzle or air gap 27A formed between the upper rim of the toilet bowl 2 and an air-guiding rim or flange lip 30A of a toilet surround or shroud 30 that externally surrounds and encloses the toilet bowl 2. The air-guiding rim or flange lip 30A extends radially inwardly over the upper rim of the toilet bowl 2 and then curves downwardly into the toilet bowl 2 while leaving the annular gap 27A therebetween. While the annular air gap 27A can be said to be continuous or substantially continuous, this still allows for spacer webs or the like (which do not interrupt the ultimately formed airstream or airflow) to extend between the upper rim of the toilet bowl 2 and the air-guiding rim or flange lip 30A of the toilet shroud 30. The airflow A directed through the annular gap 27A thus forms a continuous sheet or film of air A flowing downwardly along the inner surfaces 2A of the toilet bowl 2. The annular width or thickness of the air gap 27A is selected depending on the toilet bowl dimensions and the total airflow volume to be provided, so as to form the sheet or film of air A with the required flow velocity to achieve the desired "air flushing" effect by "flushing" down any waste material from the surfaces 2A. The annular plan shape of the air gap 27A, e.g. as shown in FIG. 2A, essentially matches the plan shape of the top opening of the toilet bowl 2 bounded by the bowl rim.

The toilet surround or shroud 30 acts as an air plenum through which the air A is provided to the air jet arrangement 27, e.g. to the annular air gap 27A. The air A is introduced into the shroud 30 at an opening 30B. In this regard, the air A may be actively provided or driven, e.g. by a blower 31 or some other driven or pressurized air source, to actively and forcefully blow the air A through the annular air gap 27A, under the control of the control unit 12 upon actuation of the flush button 12A and in coordination with the operation of the waste valve 3. Alternatively, the air A may be passively provided into the plenum space enclosed by the shroud 30, whereby a suction flow of this air A is induced through the air gap 27A into the toilet bowl 2 by the suction flow that flows out through the drain 2B once the waste valve 3 is opened. In either case, the shroud 30 also helps to muffle the noise of the vacuum flushing operation.

As an alternative to FIGS. 2A, 2B and 2C, the air jet arrangement 27 may be formed by air-directing configurations on the bottom of a toilet seat 29 provided on the toilet bowl, or the air jet arrangement may comprise a great number of individual air jet holes (rather than the annular air gap 27A) so as to form the continuous sheet or film of air A flowing along the inner surfaces 2A of the bowl 2 as described above.

As a further component, the toilet is preferably equipped with a cover or lid 28, which selectively covers the bowl 2 in the usual fashion and/or also enhances the passive flow of air A through the air jet arrangement 27. For this purpose, the cover 28 is adapted to close the top opening of the bowl sufficiently tightly to cause the induced airflow A to enter the bowl through the air nozzle or gap 27A from the plenum space within the shroud 30, if the toilet seat 29 and the cover 28 are closed before actuating the suction waste valve 3. Thus, a proper flushing operation of the toilet by a passenger who has used the toilet involves first lowering or closing the seat 29 and cover 28, and then actuating the flush button 12A.

Figure 3:
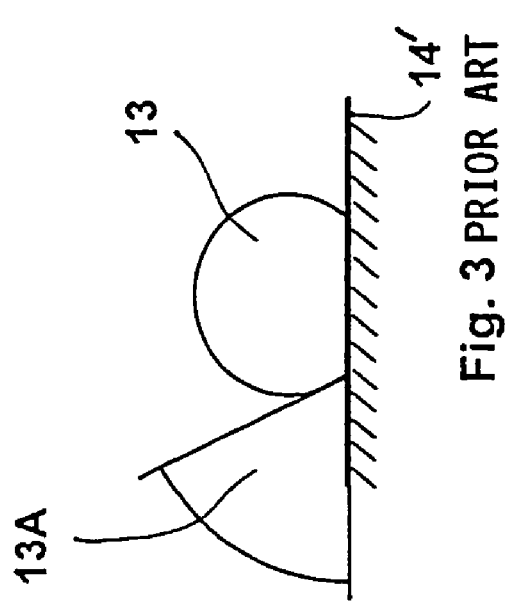
FIG. 3 represents a wetting angle of a conventional surface without coating.
Figure 4:
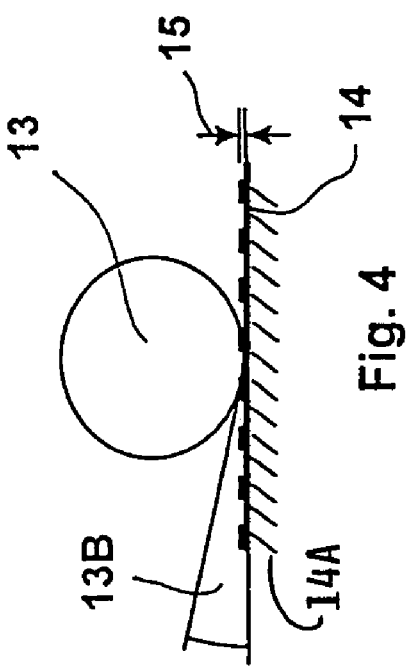
FIG. 4 represents a wetting angle of a surface coated with a nanocoating according to the invention.

FIGS. 3 and 4 illustrate to what extent a nanocoating will reduce the wetting angle of a liquid or waste droplet 13 on the surface 14 of a toilet bowl 2. FIG. 3 shows a conventional surface 14' without a coating or, for example, with a PTFE-coated toilet bowl. A droplet 13 of water or urine or feces is located on the surface 14 of the toilet bowl 2. The wetting angle 13A is relatively large (e.g. 65°) in the conventional toilet bowl 2 and thus the droplet 13 can adhere to the surface 14'.

FIG. 4 illustrates a wetting angle 13B of a droplet 13 on a nanocoating 15 disposed directly on and in contact with the surface 14 of a structural substrate 14A of a toilet bowl 2 according to the invention. As can be seen, the wetting angle 13B on the nano-coated toilet bowl 2 is much smaller than that of the uncoated toilet bowl shown in FIG. 3, and, as a result, the droplet 13 will have a significantly reduced wetting adhesion on the surface and will glide or roll over the surface of the nano-coated toilet bowl 2 much more easily, simply under the force of gravity. For example the wetting angle 13B may be in a range from 0° to 25°, or preferably 0° to 10°.

The nanocoating 15 is produced by means of nanotechnology and is applied to the surface 14, with or without an intervening base layer. The nanocoating 15 has a coating thickness in the nanometer range, e.g. less than 10 nanometers, or preferably less than 5 nanometers, or even less than 1 nanometer. Nanotechnology provides films with surfaces that are highly ordered on the nano-scale, and with a low surface energy, so that when such a surface is wetted by a droplet, the wetting angle 13B approaches 0°, thereby providing a best possible achievable anti-adhesion coating. This anti-adhesion nanocoating 15 inhibits or at least substantially reduces the adhesion of the droplet 13 of water or urine or particles of fecal matter to the surfaces of the toilet bowl 2 and/or other components (e.g. inner surfaces of the waste pipe 4 and the waste tank 5) of the toilet system shown in FIG. 1 that are coated with the nanocoating 15. The droplets 13 fall under the force of gravity into the drain 2B of the toilet bowl 2, which is also preferably coated, and are then suctioned off by the effect of the vacuum via the waste collection pipe 4 into the waste collection tank 5.

Figure 5A:
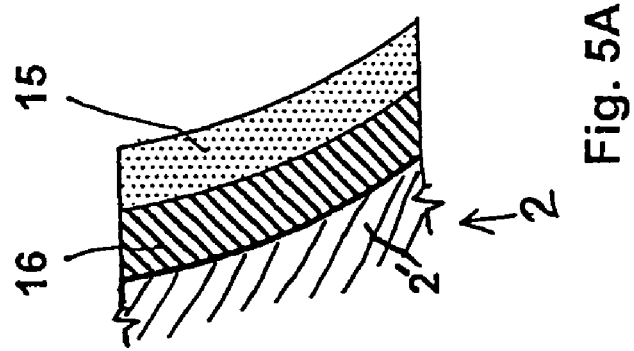
FIG. 5A shows the detail area VA of the coating on the toilet bowl of FIG. 5.

FIG. 5 shows a detail of the toilet bowl 2 according to the invention and FIG. 5A shows a much enlarged sectional view of the nanocoating 15 on the surface of the toilet bowl 2. Preferably, the base material or structural substrate 2' of the toilet bowl 2 is made of stainless steel, in view of its corrosion-inhibiting properties, and its ductility or lack of brittleness. Synthetic materials, e.g. plastics, however, may also be used for the toilet bowl 2 and for other components of the toilet system.

In the embodiment shown in FIGS. 5 and 5A, the substrate 2' of the toilet bowl 2 is first coated with a base coating 16. The base coating 16 may be necessary in some cases, for example, when it is difficult to apply the nanocoating 15 directly to the base material or substrate 2' of the toilet bowl for lack of adequate adhesion or because the roughness is too great. In such cases the nanocoating 15 can be produced with better results when applied to the intermediate base coating 16.

In a preferred embodiment, the surface of the toilet bowl substrate or base material 2' to be coated is first pretreated before the base coating 16 or the nanocoating 15 is applied.

The surface is first subjected to a grinding and polishing process in order to obtain a surface roughness in the range of less than 100 nm and a mean roughness in the range of less than 10 nm. Subsequently, the surface is cleaned with an organic solvent and/or by an ultrasound cleaning process.

The application of the nanocoating 15 to the toilet bowl 2 will now be described in greater detail. Preferably, metals or elements of the fourth major group of the periodic system, or alternatively and more particularly Cr, Ti, Mn, Ni, Ta, Al, V, W, Co, Be, Zr, Hf, Nb, Mo, C, Si, Ge or Sn, or compounds with these elements are used to make the nanocoating 15. It is possible to use compounds with a metallic bonding property, in particular carbides such as MC as well as secondary carbides $M_2C$, $M_3C$, $M_6C$, $M_7C$, $M_{23}C_6$, whereby M designates a metal or an intermetallic metal group. It is furthermore possible to use nitrides of the structure MN or borides of the structure MB, whereby, again, the M stands for a metal.

Alternatively, it is possible to produce the nanocoating 15 from a compound having a covalent bonding property such as, for example $B_4C$, SiC, BN, $Si_3N_4$ or $MoS_2$.

In a further alternative, the nanocoating 15 can be made from a composition having an ionic bonding property, such as, for example $Al_2O_3$ or $ZrO_2$ or BeO. In a further embodiment the nanocoating 15 can be made from a sialon composition, i.e. an alloy of silicon nitride and aluminum oxide, or from polymers.

The nanocoating, also referred to as a "thin film" or an "ultra thin film", can be produced by classic cathodic deposition, or vapor deposition or sputtering methods, or by means of resistance heating through vacuum assisted processes. The demands on the production of a coating by means of nanotechnology are characterized by atomically precise boundaries and by controlling the deposition of layers that are each only one atom thick. For the most part, applied vacuum methods are based either on molecular beam epitaxy (MBE) or deposition from a gas phase.

Possible methods of production are, for example: cathodic sputtering; ionic implantation; sputter techniques (plasma beam source, magnetron sputtering, radio frequency diode sputtering); gas phase deposition (chemical vapor deposition—CVD, atomic layer epitaxy—ALE, and chemical beam epitaxy—CBE); plasma assisted chemical vapor deposition—PACVD; and physical vapor deposition—PVD.

As a further alternative, an anti-adhesion coating can be formed on the basis of inorganic-organic nanocompositions with a low surface energy. Such a coating can be formed by generally known coating techniques to apply the coating material including nanoparticles therein, such as by dipping immersion, spray coating, or centrifugal spin coating or the like, followed by curing or hardening of the coating layer by UV-radiation and/or thermal heating, whereby the nanoparticles of the resulting coating achieve the desired anti-adhesion properties.

When producing the nanocoating 15 according to the possible methods, it is essential that the nanocoating is formed rather soft and non-brittle, as this will prevent parts of the nano-coating 15 from peeling from the toilet bowl 2.

The magnetron sputter technique is the preferred method of producing the nanocoating 15. This technique, which is generally known to a person of ordinary skill in the art, belongs to the group of methods referred to as cathodic sputtering. According to this method, the coating is applied in a vacuum and a solid base is coated with metallic or non-metallic layers. The coating material on the cathodes is atomized or sputtered by bombardment of the material with gas ions in a gas atmosphere. The material is then deposited on the toilet bowl substrate surface as a coating. The ions ensure that the upper atomic layers from the coating material are converted by impulse exchange into the gaseous state. The coating material, now in a gaseous state, is then deposited on the surface to be coated. The thermal stress on the toilet bowl substrate to be coated is relatively low when this magnetron sputtering technique is used. It is currently possible to attain a coated area diameter of up to 150 mm, with a coating deposition rate of 0.1 to 1 mm/min when using a double ring magnetron source. According to the invention, the nanocoating 15 is to be applied to rather large surface areas of the toilet bowl, and optionally other portions of the toilet system (e.g. inside surfaces of the waste pipe and the waste tank), for example waste-contacting surface areas of at least 250 $cm^2$ or even at least 500 $cm^2$.

Application of the nanocoating 15 to the waste-contacting surface of the toilet bowl 2 has been described in greater detail above. It is possible, of course, similarly to apply the nanocoating 15 using suitable application methods to the waste-contacting surfaces of other components of the toilet system that come into contact with fecal material or other waste material. It is within the scope of the invention, for example, to coat the interior of the waste collection pipe 4, or at least portions of the waste collection pipe 4 such as branching areas, or to coat inner surface (or at least a portion thereof) of the waste collection tank, in order to reduce as much as possible the effort involved with cleaning and maintaining the toilet system.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

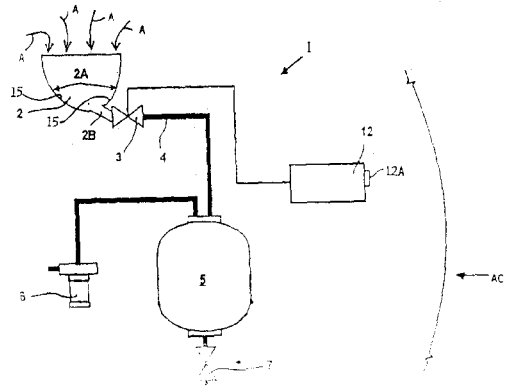

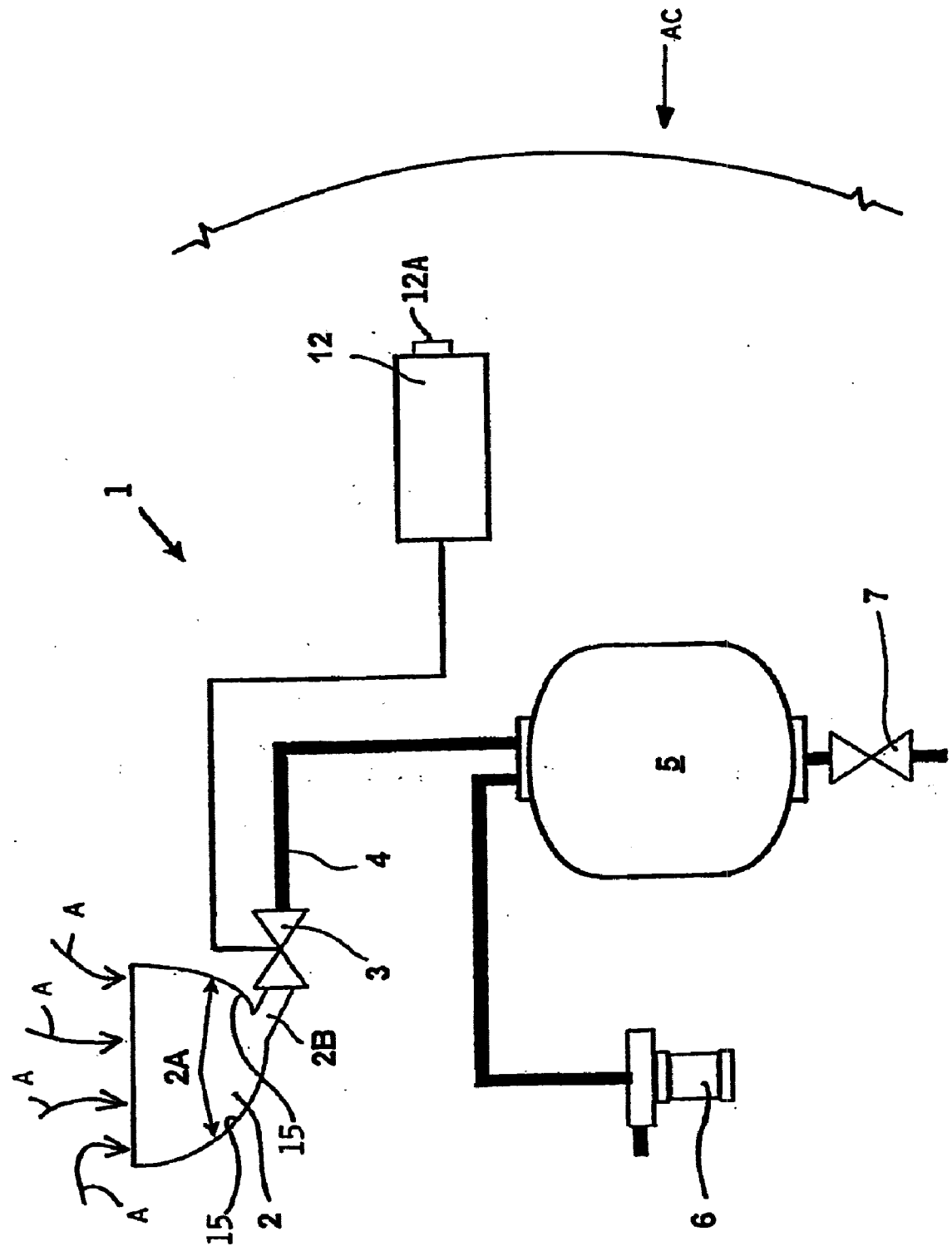

What is claimed is:

1. In an aircraft including an aircraft fuselage, and a vacuum toilet system installed in said fuselage, said vacuum toilet system including a toilet having a toilet bowl, a waste collection tank having an internal pressure below an air pressure prevailing in said toilet bowl, a waste valve connected to an outlet of said toilet bowl, and a waste pipe connecting said waste valve to said waste collection tank;

an improvement in said vacuum toilet system, wherein
said vacuum toilet system does not include a flushing liquid storage tank, does not include a flushing liquid supply pipe, does not include a flushing liquid nozzle for directing a flushing liquid into said toilet bowl, and expressly excludes all means of supplying a flushing liquid into said toilet bowl,
said vacuum toilet system further comprises an air jet arrangement arranged and adapted to direct an airstream downwardly along an interior surface of said toilet bowl toward said outlet,
said toilet bowl comprises a structural substrate and a nanocoating provided on said structural substrate to form said interior surface of said toilet bowl, and
said nanocoating is a thin film that has a thickness less than 10 nanometers and that is highly ordered and waste material repellant as formed by a nanotechnology process.

2. The toilet system in the aircraft according to claim 1, wherein said toilet further includes a shroud surrounding and enclosing said toilet bowl, and said air jet arrangement comprises an annular air gap formed between an upper rim of said toilet bowl and an air-guiding flange rim of said shroud that extends radially inwardly over said upper rim of said toilet bowl and downwardly into said toilet bowl spaced radially inwardly from said upper rim, whereby said annular air gap directs said airstream as a sheet of air downwardly along said interior surface of said toilet bowl toward said outlet.

3. The toilet system in the aircraft according to claim 2, wherein said shroud encloses an air plenum therein outwardly around said toilet bowl, and said air plenum communicates with said annular air gap.

4. The toilet system in the aircraft according to claim 3, wherein said toilet further comprises a toilet lid adapted to selectively close and open a top opening of said toilet bowl, and wherein said shroud further has an air inlet through which air is passively drawn into said air plenum and from said air plenum through said annular air gap into said toilet bowl and from said outlet of said toilet bowl through said waste valve and said waste pipe to said waste collection tank by said internal pressure in said waste collection tank being below said air pressure prevailing in said toilet bowl when said waste valve is opened and said toilet lid is closed.

5. The toilet system in the aircraft according to claim 3, further comprising a pressurized or driven air source connected to said air plenum so as to force air into said air plenum from said air source.

6. The toilet system in the aircraft according to claim 1, wherein said air jet arrangement comprises an air nozzle arrangement configured and arranged so as to direct said airstream as a sheet of air downwardly along said interior surface of said toilet bowl toward said outlet.

7. The toilet system in the aircraft according to claim 6, wherein said air nozzle arrangement comprises an annular air gap extending continuously around an inner side of an upper rim of said toilet bowl.

8. An aircraft toilet system for collecting waste material including at least one of urine or feces in an aircraft, said system comprising:
a toilet bowl with a bowl outlet and a first waste-contacting surface that is at least a portion of an inner bowl surface of said toilet bowl adapted to come into contact with the waste material;
a waste discharge arrangement that is adapted to convey the waste material from said toilet bowl, and that includes a waste pipe connected to said bowl outlet and adapted to convey the waste material therethrough, a waste collection tank connected to said bowl outlet by said waste pipe and adapted to receive and collect the waste material therein, and a waste suction valve connected and interposed in said waste pipe between said bowl outlet and said waste collection tank, wherein at least one of said waste pipe, said waste collection tank or said waste suction valve has a second waste-contacting surface adapted to come into contact with the waste material; and
a suction source connected to said waste discharge arrangement and adapted to induce a suction airflow that flows into said toilet bowl from an outside space outside of said toilet bowl, flows along said first waste-contacting surface, and flows out of said toilet bowl through said suction valve when said suction valve is open, such that said suction airflow assists in removing the waste material from said toilet bowl;
wherein at least said toilet bowl and optionally said waste discharge arrangement respectively comprises a respective structural substrate and a respective nanocoating disposed directly or indirectly on said respective structural substrate so that said respective nanocoating respectively forms at least said first waste-contacting surface and optionally said second waste-contacting surface;
wherein said nanocoating is a thin film having a thickness in a nanometer range, said thin film has been formed by a nanotechnology process, and said thin film has such a character so as to provide a wetting angle of 0° to 25° with respect to a droplet of the waste material, and
expressly excluding all means of supplying a flushing liquid into said toilet bowl.

9. The toilet system according to claim 8, further comprising an air jet arrangement that communicates from the outside space outside of said toilet bowl into said toilet bowl and that is arranged and adapted to direct an airstream along said first waste-contacting surface.

10. The toilet system according to claim 9, further comprising a shroud surrounding said toilet bowl and enclosing said outside space as an air plenum space inside said shroud, and a toilet lid adapted to selectively close and open a top opening of said toilet bowl, wherein said air jet arrangement includes at least one air nozzle that communicates from said air plenum space into said toilet bowl and that is oriented to direct the airstream along said first waste-contacting surface.

11. The toilet system according to claim 10, wherein said at least one air nozzle comprises an annular air gap extending around an inner side of an upper rim of said toilet bowl.

12. The toilet system according to claim 10, arranged and adapted so that the suction airflow through said suction valve sucks the airstream from the air plenum space through said at least one air nozzle into said toilet bowl.

13. The toilet system according to claim 8, wherein at least one of said waste pipe, said waste valve or said waste collection tank additionally respectively comprises said respective structural substrate and said respective nanocoating.

14. The toilet system according to claim 8, wherein said wetting angle is 0° to 10° with respect to the droplet of the waste material.

15. An aircraft toilet system for collecting waste material including at least one of feces and urine in an aircraft, comprising:
a toilet bowl comprising a bowl structure substrate, a bowl outlet, and a nanocoating that is provided on at least a portion of an inner bowl surface of said bowl structure substrate and that forms a first waste-contacting surface adapted to come into contact with the waste material, wherein said nanocoating is a thin film less than 10 nm thick and has an anti-adhesion character so as to provide a wetting angle of 0° to 25° with respect to a droplet of the waste material;
a waste discharge arrangement that is adapted to convey the waste material from said toilet bowl, and that includes a waste suction valve connected to said bowl outlet, a waste pipe connected to said waste suction valve and adapted to convey the waste material therethrough, and a waste collection tank connected to said waste pipe and adapted to receive and collect the waste material therein, wherein at least one of said waste pipe, said waste collection tank or said waste suction valve has a second waste-contacting surface adapted to come into contact with the waste material;
a suction source connected to said waste discharge arrangement and adapted to induce a suction airflow from said toilet bowl through said suction valve when said suction valve is open, such that said suction airflow assists in removing the waste material from said toilet bowl; and air directing means that direct at least a portion of said airflow along said first waste-contacting surface downwardly toward said bowl outlet; and expressly excluding all means of supplying a flushing liquid into said toilet bowl.

16. An aircraft toilet system for collecting waste material including at least one of urine or feces in an aircraft, said system comprising:

a toilet bowl with a bowl outlet and a first waste-contacting surface adapted to come into contact with the waste material;

a toilet lid adapted to selectively close and open a top opening of said toilet bowl;

a waste discharge arrangement that is adapted to convey the waste material from said toilet bowl, and that includes a waste pipe connected to said bowl outlet and adapted to convey the waste material therethrough, a waste collection tank connected to said bowl outlet by said waste pipe and adapted to receive and collect the waste material therein, and a waste suction valve connected and interposed in said waste pipe between said bowl outlet and said waste collection tank, wherein at least one of said waste pipe, said waste collection tank or said waste suction valve has a second waste-contacting surface adapted to come into contact with the waste material;

an air jet arrangement that communicates from an outside space outside of said toilet bowl to an interior of said toilet bowl and that includes at least one air nozzle oriented to direct an airstream along said first waste-contacting surface; and a suction source connected to said waste discharge arrangement and adapted to induce a suction airflow, which, when said toilet lid closes said top opening of said toilet bowl, sucks said airstream into said toilet bowl from said outside space through said at least one air nozzle, so that said airstream flows along said first waste-contacting surface and flows out of said toilet bowl through said suction valve when said suction valve is open, such that said airstream assists in removing the waste material from said toilet bowl;

wherein at least one of said toilet bowl or said waste discharge arrangement comprises a structural substrate and a nanocoating less than 10 nm thick disposed directly or indirectly on said structural substrate so that said nanocoating forms at least one of said first waste-contacting surface or said second waste-contacting surface; and expressly excluding all means of supplying a flushing liquid into said toilet bowl.

17. The toilet system according to claim 16, wherein said at least one air nozzle comprises an annular air gap extending around an inner side of an upper rim of said toilet bowl.

* * * * *

UNITED STATES PATENT AND TRADEMARK OFFICE
CERTIFICATE OF CORRECTION

PATENT NO. : 6,977,005 B2
APPLICATION NO. : 10/620480
DATED : December 20, 2005
INVENTOR(S) : Erdmann et al.

It is certified that error appears in the above-identified patent and that said Letters Patent is hereby corrected as shown below:

Drawings:
The title page should be deleted and substitute therefor the attached title page Column 10,
Line 26, after "coat", insert --the--;
Line 61, after "material", replace "repellant" by --repellent--;

Column 12,
Line 40, after "feces", replace "and" by --or--.

Signed and Sealed this

Tenth Day of October, 2006

JON W. DUDAS
*Director of the United States Patent and Trademark Office*

(12) United States Patent
Erdmann et al.

(10) Patent No.: US 6,977,005 B2
(45) Date of Patent: Dec. 20, 2005

(54) WATERLESS VACUUM TOILET SYSTEM FOR AIRCRAFT

(75) Inventors: Wolfgang Erdmann, Buxtehude (DE); Torsten Glenke, Pinneberg (DE); Hans-Juergen Heinrich, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 164 days.

(21) Appl. No.: 10/620,480

(22) Filed: Jul. 15, 2003

(65) Prior Publication Data
US 2004/0010843 A1 Jan. 22, 2004

Related U.S. Application Data

(63) Continuation-in-part of application No. 10/017,491, filed on Oct. 22, 2001, now abandoned, which is a continuation-in-part of application No. 09/603,854, filed on Jun. 26, 2000, now abandoned.

(30) Foreign Application Priority Data
Jun. 24, 1999 (DE) .............................. 199 28 894

(51) Int. Cl.⁷ .......................... B01D 35/16; E03D 5/00
(52) U.S. Cl. ................... 55/431; 4/316; 4/321; 4/434; 4/472
(58) Field of Search .................... 4/316, 321, 431–434, 4/449, 472, 475, 477, DIG. 10; 55/431

(56) References Cited

U.S. PATENT DOCUMENTS

| 1,050,435 A | * | 1/1913 | Eastman | 4/477 |
| 2,700,775 A | * | 2/1955 | Martin | 4/111.5 |
| 3,405,454 A | | 10/1968 | Zeff | 34/371 |
| 3,457,567 A | | 7/1969 | Criss | 4/472 |
| 4,346,002 A | | 8/1982 | Petzinger | 210/202 |
| 4,678,685 A | | 7/1987 | Hasson et al. | 427/235 |
| 4,928,326 A | | 5/1990 | Olin et al. | 4/300 |
| 5,245,711 A | | 9/1993 | Oldfelt et al. | 4/435 |

(Continued)

FOREIGN PATENT DOCUMENTS

DE 9201684 6/1992

(Continued)

OTHER PUBLICATIONS

A brochure entitled: "Das Zentrale Vakuumtoiletten-System Fuer Die Schiffsausruestung", from the company *sanivac Vakuumtechnik GmbH*, 1997, 4 pages.

(Continued)

*Primary Examiner*—Richard L. Chiesa
(74) *Attorney, Agent, or Firm*—W. F. Fasse; W. G. Fasse

(57) ABSTRACT

A waterless vacuum toilet system for an aircraft includes a toilet bowl connected via a suction valve and a waste collection pipe to a waste collection tank. Waste-contacting surfaces that come into contact with urine and fecal waste are coated with an adhesion-inhibiting or adhesion-reducing nanocoating. The adhesion of waste is significantly reduced, and the need for flushing water is completely eliminated. Instead, an air jet arrangement preferably including an annular ring nozzle or annular air gap directs an airflow into the toilet bowl and along the nanocoated waste-contacting surface thereof, to "air flush" the waste material from these surfaces. The flushing airflow may be induced through the air jet arrangement into the toilet bowl by the suction applied through the suction valve. The "air flushed" toilet system substantially reduces the total system weight and eliminates the need for toilet flushing water to be carried in the aircraft.

17 Claims, 3 Drawing Sheets